R. B. TOLLES
Binocular Eye Piece for Microscopes.
No. 56,125.
Patented July 3, 1866.
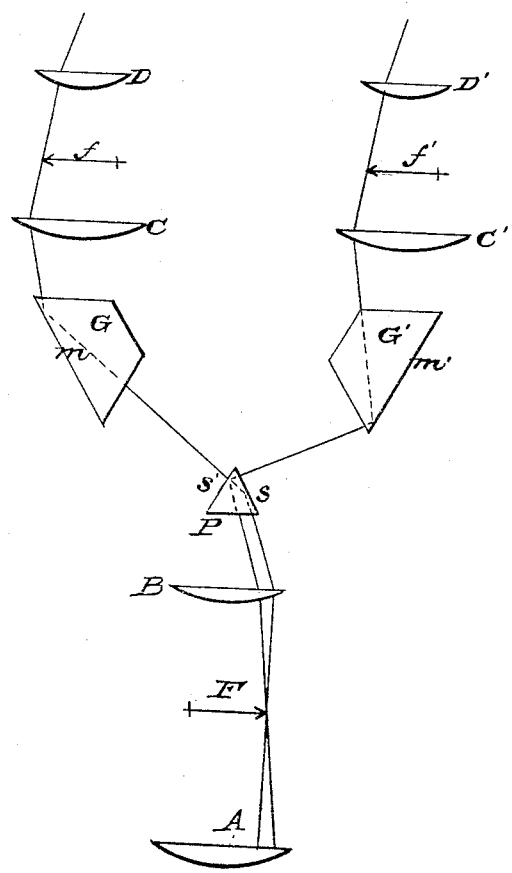

UNITED STATES PATENT OFFICE.

ROBERT B. TOLLES, OF CANASTOTA, NEW YORK.

IMPROVEMENT IN BINOCULAR EYE-PIECES FOR OPTICAL INSTRUMENTS.

Specification forming part of Letters Patent No. 56,125, dated July 3, 1866.

*To all whom it may concern:*

Be it known that I, ROBERT B. TOLLES, of Canastota, in the county of Madison, in the State of New York, have invented a new and Improved kind of Binocular Eye-Piece; and I do hereby declare that the following is a full and exact description thereof, reference being had to the accompanying drawing, and to the letters of reference marked thereon.

The nature of my invention consists in so constructing an eye-piece and so applying it to an object-glass that it shall divide the optical pencil transmitted by such object-glass, and also shall, as to each part of the divided pencil, form either a real or virtual image of the object beyond the place of the division of the optical pencil, and this in a manner suitable for binocular vision.

To enable others to make and use my invention, I will proceed to describe its construction and operation.

In the construction of a binocular eye-piece of the form herein described I use three prisms, (represented in section at P G G',) which prisms, as to form, arrangement, and relative distances, are according to those used by Nachét in his well-known binocular microscope.

The lenses represented at A B C D constitute a monocular erecting eye-piece. The lenses A B C' D' in like manner constitute a monocular erecting eye-piece.

The small prism P is to be placed at or near the point between the lenses B C B C' where the pencils in such an eye-piece cross, and the office of the system of prisms is to direct an appropriate portion of the light transmitted by the system of lenses A B to the oculars C D C' D', an image of the object to be viewed being formed in each ocular at $f f$.

When the above-described eye-piece is applied to an object-glass at a proper distance for view of the object, the light transmitted by the object-glass and passing through the lens A is refracted to a focus at F. The pencils proceeding from the image of the object formed at F are refracted by the lens B, so that they cross at or near the place of the small prism P.

What I claim as my invention, and desire to secure by Letters Patent, is—

The construction of an eye-piece in such a manner that the division of the optical pencil necessary to give binocular vision of an object is effected in the eye-piece itself, restricting my claim, however, to that form of binocular eye-piece in which two real or virtual images of the object are formed in the eye-piece after such division of the pencil has taken place.

ROBT. B. TOLLES.

Witnesses:
 A. D. KENNEDY,
 CHAS. S. HUTCHINSON.